United States Patent [19]

Grover

[11] Patent Number: 4,902,038
[45] Date of Patent: Feb. 20, 1990

[54] INTERLOCKING WEIGHT SYSTEM FOR VEHICLE CARGO COMPARTMENTS

[76] Inventor: Bruce D. Grover, 2525 NW. Fifth Street, Minot, N. Dak. 58701

[21] Appl. No.: 236,609

[22] Filed: Aug. 25, 1988

[51] Int. Cl.⁴ .............................................. B62D 63/00
[52] U.S. Cl. ..................................... 280/759; 105/422
[58] Field of Search ............. 280/757, 759; 296/39 R, 296/39 A, 39.1, 39.2; 105/422

[56] References Cited

U.S. PATENT DOCUMENTS

| | | | |
|---|---|---|---|
| 2,060,164 | 11/1936 | Bonsall | 105/422 |
| 4,332,203 | 6/1982 | Flowers | 105/422 |
| 4,339,142 | 7/1982 | Tanner et al. | 280/759 |
| 4,482,169 | 11/1984 | Yim | 280/759 |
| 4,537,423 | 8/1985 | Nav et al. | 280/759 |

*Primary Examiner*—Richard A. Bertsch
*Attorney, Agent, or Firm*—Moore & Hansen

[57] ABSTRACT

A traction weight system comprised of a plurality of generally rectangular cast metal plates sized so as to be arranged in a variety of two dimensional arrays to comport with the dimensions of different vehicle cargo compartments, each plate having means to interlock that plate with those adjacent plates along or across their closely confronting edges. The plates may be interlocked by various means, including integral tongue and groove structures formed in each plate, or a series of aligned notches which may receive coupling pins. Each plate preferably has a height dimension substantially less than its width or length dimensions, so that the plates may be arranged across the floor or bed of the cargo compartment without interfering with the normal uses of that cargo compartment for storing or transporting cargo.

24 Claims, 3 Drawing Sheets

INTERLOCKING WEIGHT SYSTEM FOR VEHICLE CARGO COMPARTMENTS

BACKGROUND OF THE INVENTION

This invention relates generally to traction weights for vehicles, and particularly to a system of interlocking plates which may be arranged in various arrays corresponding to the dimensions of different vehicle cargo compartments.

The benefits of increased traction and maneuverability in vehicles which are weighted on the drive wheels are well recognized. Both passenger vehicles and pickup trucks are aided in snow or winter conditions and over rough terrain by placing greater weight on the pair of wheels that provide drive power, or in the case of four wheel drive vehicles on all the wheels.

Recently, the introduction of front wheel drive in many front engine vehicles has provided this same result. In rear wheel drive cars and trucks, however, it is generally necessary to add additional weight in the rear cargo compartment above the rear axle.

People have used a number of different methods to weight their vehicles. One common step is to place bags of sand, salt, or gravel in the trunk or a car or cargo bed of a truck. The salt and sand can also be useful in freeing a vehicle which becomes stuck in the snow or on ice. Unfortunately, the bags may be easily ripped or punctured by many sharp edged items frequently carried in the vehicle cargo compartment, or will become saturated and deteriorate if carried in an open cargo bed.

In place of bags of sand, other people have used bricks or concrete blocks. While being more durable and easy to handle, such bricks or blocks are generally less dense than their bagged counterparts, and will generally shift around in the cargo compartment risking damage to the vehicle or other cargo.

There have been several attempts to design improved systems for adding traction weights to vehicle cargo compartments, predominantly for pickup or similar trucks having cargo beds.

U.S. Pat. No. 3,727,971 discloses a system of utility receptacle units which fit along the sidewalls of a truck's cargo bed, with a recessed region to accommodate the wheel well. These utility compartments may be filled with gravel to increase traction weight, and present less of a risk of puncture or spilling than do bags of similar substances.

U.S. Pat. No. 4,190,281 discloses a system of ballast containers which lock into place along the sidewalls of a truck bed, and may be filled with sand or a similar substance. These ballast containers are designed to fit between the wheel well and the vertical framing and cab wall, and are shaped to lock into place against a sidewall having a particular predetermined configuration.

While being improvements over the concept of using bags of sand or gravel, each of these systems has several common drawbacks. First, each utilizes some of the area of the truck bed which might otherwise be used for storing or transporting cargo. Second, each must be designed and sized to fit a particular type of cargo compartment, depending upon the shape of the sidewalls, placement and dimensions of the wheel wells, and the type of flooring used in the cargo bed. Third, once filled, these weights cannot be easily removed or repositioned without emptying the contents because of the great weight involved Finally, these weight systems would be impractical to use in the cargo compartment of a vehicle other than a pickup truck, such as the trunk of a passenger vehicle.

U.S. Pat. Nos. 3,944,252 and 4,094,534 disclose weight systems mountable on the exterior of a cargo compartment, particularly for the forward end of a tractor or other agricultural vehicle. The weights generally comprise cast metal plates which are removably mounted in a layered configuration on a bracket assembly.

While such a detachable weight system is necessary for the steerable front wheels of tractors and other equipment where a cargo compartment is not available, such systems would be neither practical nor workable in other types of vehicles. First, in most instances it is more important to place additional weight for traction over the drive wheels, and in trucks and passenger vehicles the engine provides sufficient weight over the steerable wheels. Second, it is not desirable to mount such weight systems outside the cargo compartment of either trucks or passenger vehicles. Besides being unattractive, such a mounting configuration greatly hampers the maneuverability of the vehicle by adding additional length or width where it is not within easy view of the driver, and similarly presents a danger to other vehicles. Finally, most trucks and passenger vehicles do not have the exposed frame members necessary to mount such weight systems in the rear of the vehicles where they would be most beneficial.

U.S. Pat. No. 4,482,169 discloses a traction rack for a rear wheel driven truck which is placed on the bed of the truck extending between the wheel wells, the rack holding a series of weights in position over the real axle.

While such a rack system would permit a slightly greater degree of flexibility in accommodating different sized truck beds and wheel well placements, it has several deficiencies. First, such a weight system is only practical to use with a truck cargo bed, and not in a passenger vehicle. Second, while permitting the weight to be focused above the rear axle, such a rack limits the total amount of weight that can be added to a vehicle to a predetermined total number of smaller weights. Third, the rack and weights together occupy the most valuable cargo storage area in the truck bed, directly between the wheel wells where the width of the truck bed is at a minimum. Fourth, because the rack and weights do not extend the full length of the truck bed, they present a hump extending across the width of the truck bed which interferes with placing larger items such as 4'×8', panels flat within the truck bed. Finally, the system as disclosed makes the individual weights difficult to remove from the vehicle, either to adjust the weight or provide more cargo space when needed.

BRIEF SUMMARY OF THE INVENTION

It is therefore one object of this invention to design a system of interlocking weights which may be used with the cargo compartment of either a truck or passenger vehicle to increase traction.

It is related object of this invention to design the above weight system such that it may be easily configured so as to be used with cargo compartments of widely disparate dimensions, shapes, and constructions, and to be positioned around irregularly shaped structural features such as frame members or enclosed wheel wells.

It is additional object of this invention to design the above weight system such that it may be easily placed within, removed from, or repositioned within the cargo compartment of the vehicle.

It is yet another object of this invention to design the above weight system such that the individual weights will not shift within the cargo compartment, and will prevent damage to other cargo or the vehicle itself.

It is a distinct object of this invention to design the above weight system such that it will not disrupt the normal uses of the cargo compartment, particularly such that it will not interfere with the central area of the cargo bed or in storing or transporting lengthy objects.

Briefly described, the traction weight system of this invention is comprised of a plurality of generally rectangular cast metal plates or molded plastic plates with a hollow interior filled with sand or the like, the plates sized so as to be arranged in a variety of arrays extending in two dimensions to comport with the dimensions of different vehicle cargo compartments, each plate having means to interlock that plate with those adjacent plates along or across their closely confronting edges. The plates may be interlocked by various means, including integral tongue and groove structures formed in each plate, or a series of aligned notches which may receive coupling pins. Each plate preferably has a height substantially less than its width or length dimension, so that the plates may be arranged across the floor or bed of the cargo compartment without interfering with the normal uses of the cargo compartment for storing or transporting cargo.

DESCRIPTION OF THE PREFERRED EMBODIMENTS

The system of interlocking weights of this invention is shown in FIGS. 1–11 and referenced generally therein by the numeral 10.

Figure 1:
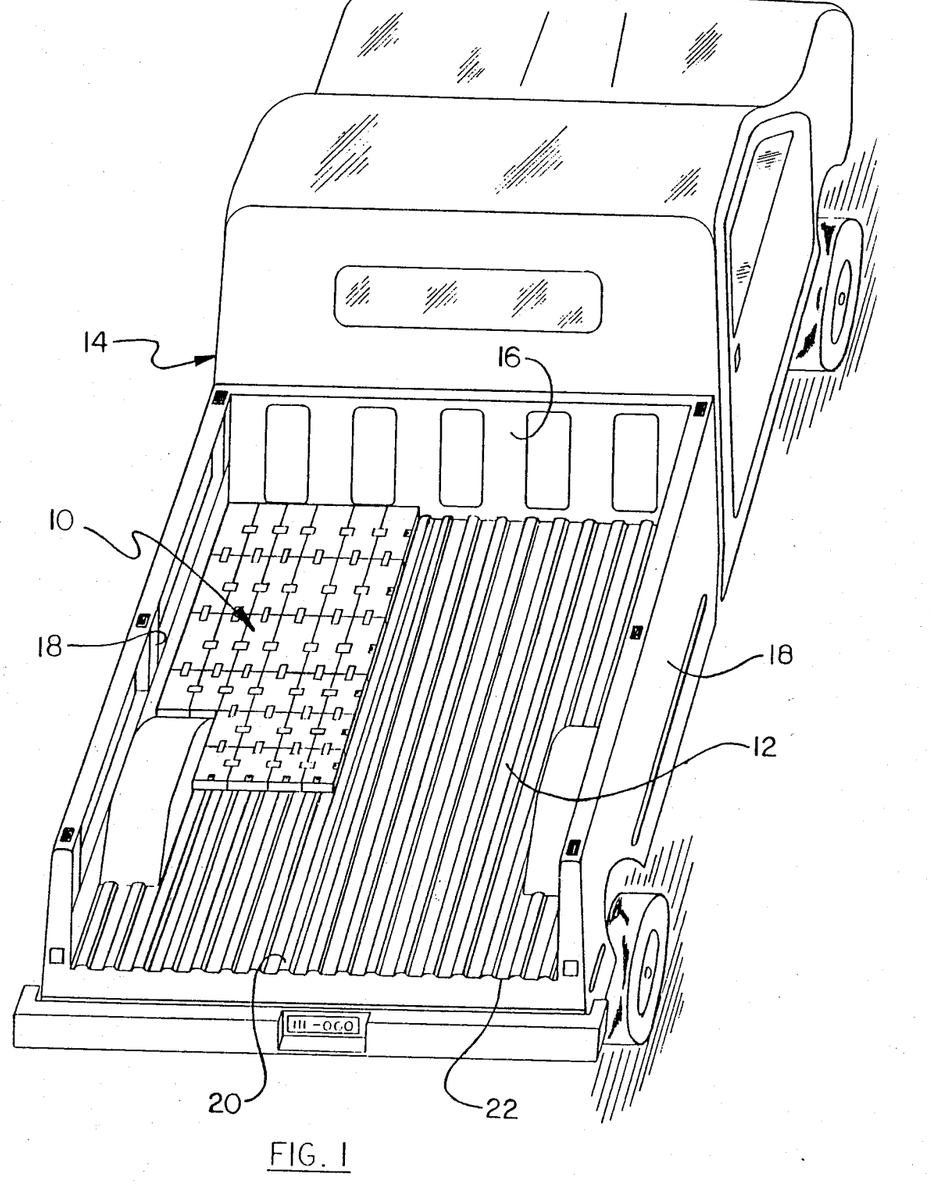
FIG. 1 is a perspective view of the interlocking weight system of this invention partially arrayed in the cargo bed of a pickup truck.
Figures 2, 3:
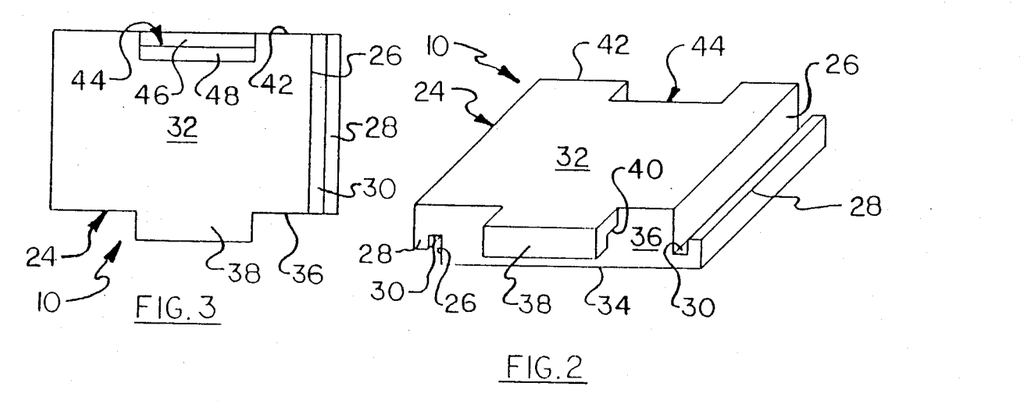
FIG. 2 is a perspective view of a tongue and groove embodiment of the interlocking weight system of this invention.
FIG. 3 is a top plan view of the tongue and groove embodiment of the interlocking weight system of this invention shown in FIG. 2.
Figure 4:
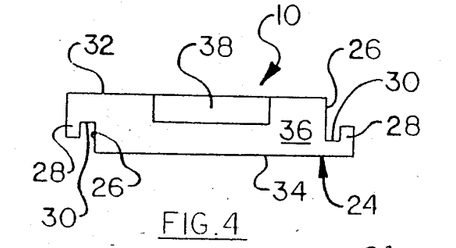
FIG. 4 is a front elevation view of the tongue and groove embodiment of the interlocking weight system of this invention shown in FIG. 2.
Figure 5:
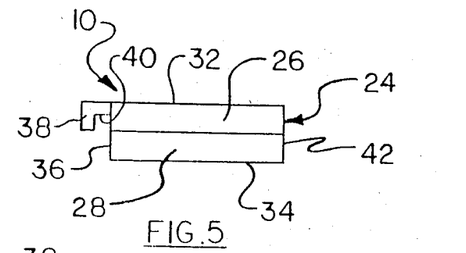
FIG. 5 is a side elevation view of the tongue and groove embodiment of the interlocking weight system of this invention shown in FIG. 2.

Referring to FIG. 1, it may be seen that the interlocking weights 10 of this invention are designed to be arranged in an array or pattern within the cargo compartment 12 of a vehicle such as a pickup truck 14, although the interlocking weights 10 may be used with any type passenger vehicle as well.

The pickup truck 14 as shown in FIG. 1 has a rear cab wall 16, a pair of opposing sidewalls 18, and a truck bed 20 or floor which define the cargo compartment 12. The pickup truck 14 may also include a rear tailgate (not shown) which would be pivotably attached near the rear edge 22 of the truck bed 20. The cargo compartment 12 has a height H, a width W measured between the interior surfaces of the sidewalls 18, and a length L measured between the rear cab wall 16 and the rear edge 22 of the truck bed 20.

Referring to FIGS. 2–5, a tongue and groove embodiment of the interlocking weight system 10 is shown. Each weight 24 is constructed from a cast plate of dense metal such as steel or may be a plate comprised of a heavy duty hollow plastic container filled with sand or the like, and has a height h which is substantially less than the width w or length l of the weight 24.

Figures 6, 7:
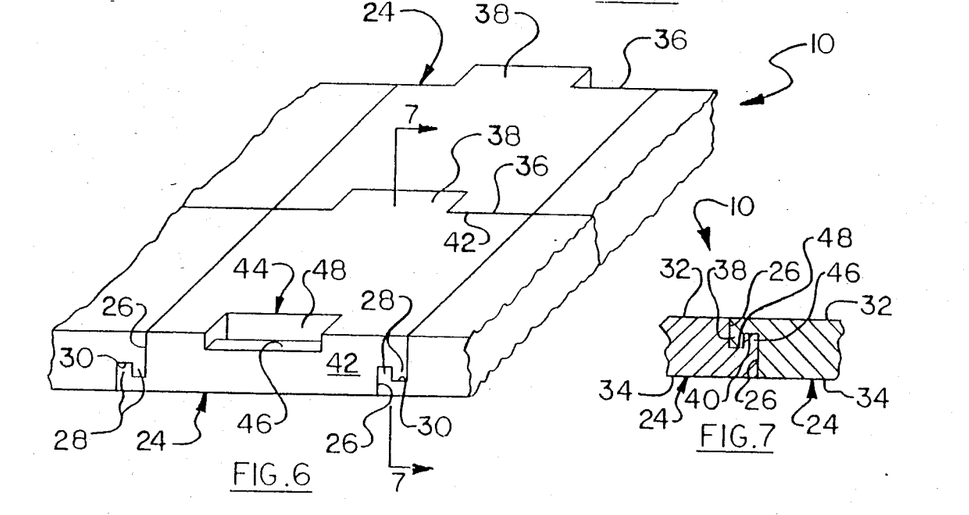
FIG. 6 is a rear perspective view of several interlocked weights of the tongue and groove embodiment shown in FIG. 2.
FIG. 7 is a cross sectional view of two of the interlocked weights of the tongue and groove embodiment shown in FIG. 2 taken through line 7—7 of FIG. 6.

Extending along the lengthwise edges 26 of each weight 24 and spaced apart from those edges 26 and generally parallel thereto are a pair of tongue members 28 spaced apart from the side edges 26 be a groove 30. The height of each tongue member 28 is less than the height h of the weight 24, but is generally equal to the depth of the groove measured from the top surface 32 of the weight 24. The width of each tongue member 28 is similarly generally equal to or slightly less than the width of the groove 30, such that the tongue member 28 of one weight 24 can be inserted into and engagingly received within one of the corresponding grooves 30 of another like weight 24, with the top surfaces 32 and bottom surfaces 34 of each weight 24 being substantially coplanar, and with the side edges 26 of each weight 24 being maintained in close and confronting edgewise contact as shown in FIG. 6. A portion of the flange member 28 of each weight 24 is engagingly and removably received within the groove 30 of a like weight 24, and vice versa, such that a portion of each flange member 28 if each weight 24 is disposed between the flange member 28 and the side edge 26 of the like weight 24 to which the weight 24 is connected along its side edges 26.

Extending from and centered along the front face 36 of each weight 24, and spaced apart from that front face 36 generally parallel thereto and coplanar with the top surface 32, is a front tongue member 38 which extends over approximately one third the width w of the weight 24. The front tongue member 38 is separated from the front face 36 by a front gap 40 similar to the grooves 30 separating the tongue members 28 from the side edges 26 of the weight 24. The rear face 42 and top surface 32 of each weight 24 define a rear channel 44 having a width substantially equal to or slightly greater than the width of the front tongue member 38 such that the front tongue member 38 can be received within the rear channel 44. The rear channel 44 is comprised of a rear wall member 46 having a height equal to the depth of the front gap 40 measured from the bottom surface 34 of the weight 24 and a thickness equal to or slightly less than the thickness of the front gap 40, and a recessed region 48 having a depth equal to the height of the front tongue member 38 and a thickness equal to or slightly greater than the front tongue member 38. The front tongue member 38 may be inserted into and engagingly received within the corresponding rear channel 44 of another like weight 24 such that the rear wall member 46 is received within the front gap 40, the top surfaces 32 and bottom surfaces 34 of each weight 24 being substantially coplanar, and with the opposing front face 36 and rear face 42 of the weights 24 being maintained in close and confronting edgewise contact, as shown in FIGS. 6 and 7.

Figures 8, 9, 10A, 10B:
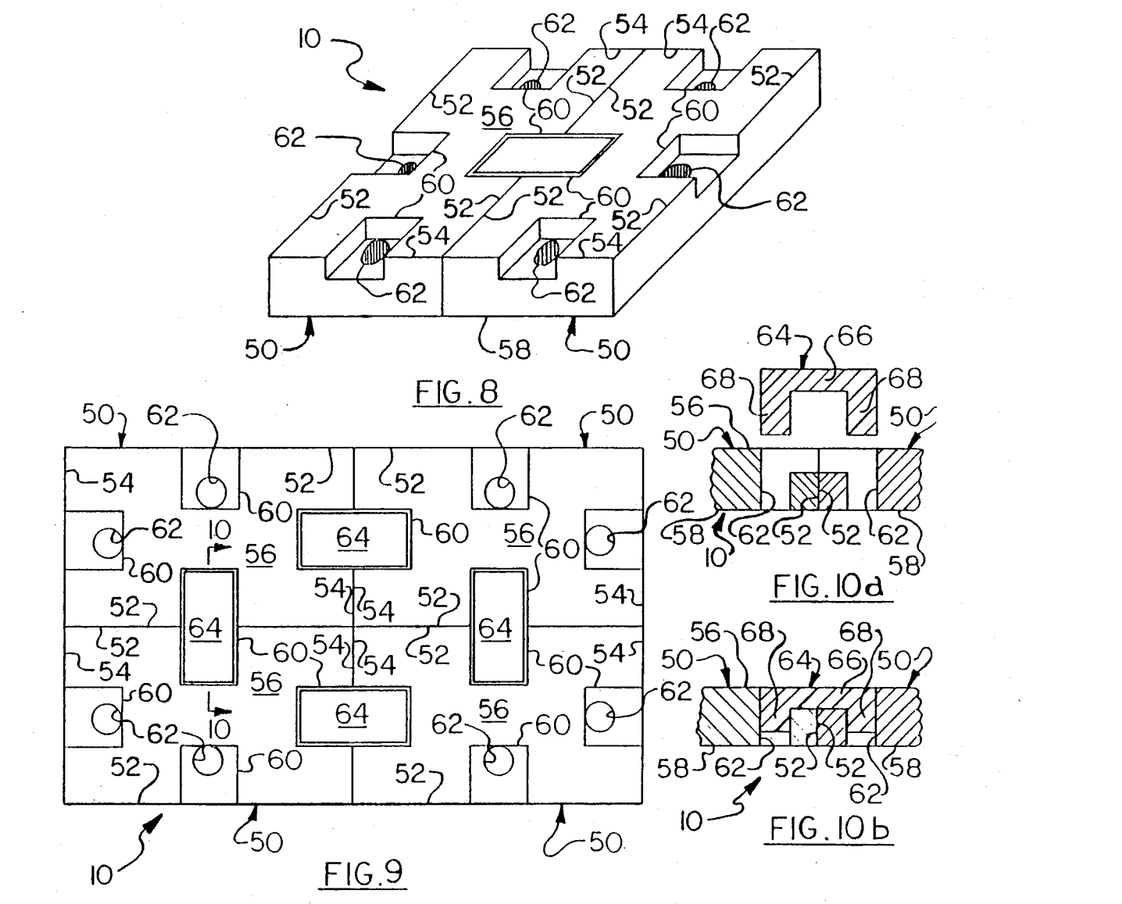
FIG. 8 is a perspective view of the notch and coupling pin embodiment of the interlocking weight system of this invention.
FIG. 9 is a top view of several interlocked weights of the notch and coupling pin embodiment shown in FIG. 8.
FIG. 10a is a cross sectional view of two interlocking weights of the notch and coupling pin embodiment shown in FIG. 8 taken through line 10—10 in FIG. 9 with the coupling pin removed from the notches.
FIG. 10b is a cross sectional view of two interlocking weights of the notch and coupling pin embodiment shown in FIG. 8 taken through line 10—10 in FIG. 9 with the coupling pin inserted in the notches.

Referring to FIGS. 8–10, a notch and coupling pin embodiment of the system of interlocking weights 10 is shown. Each weight 50 similarly has a height h which is substantially less than the width w or length l of the weight 50, each weight 50 having a pair of opposing side edges 52 and a pair of opposing end edges 54, a top surface 56, and a bottom surface 58. Centered along each side edge 52 and end edge 54, and defined by said edges 52, 54 and said top surface 56 is a notch 60 recessed a predetermined depth from said top surface 56, each weight 50 further defining four bores 62 each extending generally perpendicular to the top surface 56 and at least partially through said weight 50 corresponding to and communicating with the notches 60, each said bore 62 being positioned in substantially the same and uniform relationship with the corresponding notch 60 as the remaining bores 62 and notches 60.

While it is contemplated that for ease of use and construction, each notch 60 can be made to have a rectangular configuration with each bore 62 having a circular cross section and being centered within the rectangular notch 60, the notches 60 and bores 62 may be given any suitable shape or cross section, and may be positioned in any manner relative to one another, which permits the weights 50 to be interlocked as described below.

Referring again to FIG. 8–10, it may seem that a U-shaped coupling pin 64 having a central bridge portion 66 and a first and second depending legs 68 extending perpendicularly therefrom may be inserted into and received within a pair of aligned and opposing notches 60 and bores 62 of two closely confronting side edges 52 or end edges 54 of two like weights 50, thereby permitting a plurality of weights 50 to be interlocked in a generally coplanar array. The central bridge portion 66 should have a thickness less than the depth of the recessed portions of the notches 60 so that no portion of the coupling pin 64 will extend above the top surface 56 of the weights 50 when the leg segments 68 are inserted in the adjacent and confronting bores 62.

Figure 11:
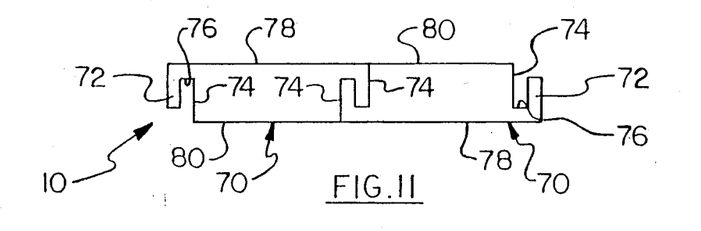
FIG. 11 is a front elevation view of the symmetrical flange embodiment of the interlocking weight system of this invention.

Referring to FIG. 11, a symmetrical flange embodiment of the interlocking weight system 10 of this invention is shown. The symmetrical flange embodiment 70 is similar to the tongue and groove embodiment 20 described above and shown in FIGS. 3–7, however, the symmetrical flange embodiment 70 differs in that each weight 70 is constructed so as to have a depending flange 72 separated from the side edge 74 of the weight 70 by a groove 76. The height of each flange 72 measured from the top face 78 of the weight 70 is equal to the depth of the groove 76 measured from the bottom face 80 of the weight 70, with the thickness of each flange 72 being substantially equal to or slightly less than the width of each groove 76 of like weights 70 so as to be slidably and engagingly received within the groove 76 of a like weight 70 when that like weight 70 is inverted and placed adjacent to and closely confronting the first weight 70. In this manner, several weights 70 may be alternatingly inverted and interconnected to form an array within a cargo compartment 12. In such an embodiment having symmetrical weights 70 which are alternatingly inverted, individual weights 70 are preferably only added to or subtracted from the array along the borders of the array, thereby mitigating against the user having to lift a plurality of weights 70 at one time.

It is understood that the interlocking weight system 10 of this invention may be formed in a variety of manners wherein the weights 10 are interconnected along vertical planes of separation, rather than horizontal planes of separation as described above in connection with the tongue and groove embodiment 20 or symmetrical flange embodiment 70. In the case where the planes of separation are completely vertical, as in a jigsaw puzzle, each weight 10 should have a generally uniform shape such that an infinite repeating pattern having two directions of extent corresponding to the length and width dimensions of each plate may be formed. In such an embodiment, each edge 26, 36, 42 of the weight 10 should define a path having both convex and concave portions of generally the same shape as the corresponding and confronting edges 26, 36, 42 of the like weight 10 so that the rear edge 42 of the weight 10 may be slidingly and removably engaged by the front edge 36 of the like weight 10, the front edge 36 of the weight 10 may be slidingly and removably engaged by the rear edge 42 of the like weight 10, and each one of the side edges 26 of the weight 10 may be slidingly and removably engaged by the opposing and confronting side edge 26 of the like weight 10.

It should be understood that all the shown forms of my invention can be formed as hollow heavy duty plastic containers filled with sand or the like and that such variations can comprise the shown plates and are within the purview of the invention.

In operation, a person may arrange a plurality of weights 10 within a cargo compartment 12 in an array which has two linear directions of extent, with those directions generally corresponding to the length L and width W dimensions of the cargo compartment 12. These linear directions of extent need not be perpendicular, however in most cargo compartments a generally perpendicular array will be preferred, with each weight 10 being interconnected within the array along at least two edges, preferably a side and an end edge, with certain weights 10 along the border of the array being interconnected along three edges, and with weights 10 in the central portions of the array being interconnected along four edges.

The weights 10 are individually interconnected, and may be individually disconnected for removal from the cargo compartment 12. To interconnect the weights 10, each weight 10 is placed adjacent to and closely confronting an opposing weight 10. In the case of the tongue and groove embodiment 24, one weight 24 having a tongue member 28, 38 which will be inserted into a corresponding groove 30 or channel 44 is generally raised above the top surface 32 of the adjacent weight 24, with the edges 26 moved into close vertical alignment, with the tongue members 28, 38 being engagingly received within the corresponding groove 30 or channel 44 when the one weight is lowered and the weights 24 are brought into coplanar horizontal alignment. In the case of the notch and coupling pin embodiment 50, each weight 50 is placed in close confronting edgewise contact with one or more similar weights 50 in an array, with the notches 60 along the confronting edges 52, 54 being generally aligned, with the depending legs 68 of a coupling pin 64 being inserted within each of the bores 62 of the adjacent notches 62 so as to interconnect the weights 50.

In this manner, the weights 10 may be interconnected into one or more generally coplanar patterns or arrays which may be extended indefinitely in either of two linear lengthwise or widthwise directions within a cargo compartment 12 of a vehicle 14.

While the preferred embodiments of the interlocking weights system 10 of this invention have been disclosed above with reference to the attached drawing figures, it is understood that certain modifications and changes may be made in the construction and operation of the system of interlocking weights 10 without departing from the spirit and scope of the appended claims.

What is claimed is:

1. A traction enhancing interlocking weight system for use in the cargo compartment of a vehicle, said cargo compartment having a length, a width, and a height, said interlocking weight system comprising:

a plurality of plates, each said plate having a height, a width, and a length, said height being substantially less than said width and said length, each plate having a pair of opposing side edges and a pair of opposing end edges;

means associated with each said plate for engagingly and removably interlocking said plate with a like one of said plates when said plate and said like plate are positioned in close confronting contact along an adjacent pair of said side edges or said end edges of the plate and the like plate, to interconnect said plurality of plates in an array, said array having a length and a width less than the length and the width of the cargo compartment, whereby the plates may be arranged and interconnected in the array within the cargo compartment so as to provide additional traction weight for the vehicle;

the width of each said plate being measured between the opposing side edges, and each said plate having a front end edge and a back end edge, the length of each said plate being measured between said front edge and said back end edge, each said plate further including a top surface and a bottom surface, the height of each plate being measured between said top surface and said bottom surface;

said means for interlocking the plate with the like plates comprising:

a flange member extending from and connected to one of the side edges of the plate;

a groove defined by the opposing side edge of the like plate to be connected to the plate, said groove being sized to receive said flange member, whereby the flange member of the plate may be engagingly and removably received within the groove of the like plate to interconnect the plates; and wherein the groove has a depth measured from the top surface of the like plate and the flange member has a thickness, the flange member extending generally downwardly relative to the top surface of the plate a distance generally less than or equal to the depth of the groove on the like plate and spaced apart from the side edge of the plate by a second groove, said second groove having a depth measured from the bottom surface of the like plate and a width, the like plate further having a second flange member having a thickness less than or equal to the width of the second groove and a height measured from the bottom surface of the like plate less than or equal to the depth of the second groove, whereby the second flange member of the like plate may be engagingly received within the second groove of the plate.

2. The weight system of claim 1 wherein the flange member extends along the entire length of the plate, and the groove extends along the entire length of the like plate.

3. The weight system of claim 1 wherein the second flange member extends along the entire length of the like plate opposing the groove, and the second groove extends along the entire length of the plate.

4. The weight system of claim 1 wherein the depth of the groove is substantially equal to the depth of the second groove, and the height of the flange member is substantially equal to the height of the second flange member.

5. A traction enhancing interlocking weight system for use in the cargo compartment of a vehicle, said cargo compartment having a length, a width, and a height, said interlocking weight system comprising:

a plurality of plates, each said plate having a height, a width, and a length, said height being substantially less than said width and said length, each plate having a pair of opposing side edges and a pair of opposing end edges;

means associated with each said plate for engagingly and removably interlocking said plate with a like one of said plates when said plate and said like plate are positioned in close confronting contact along an adjacent pair of said side edges or said end edges of the plate and the like plate, to interconnect said plurality of plates in an array, said array having a length and a width less than the length and the width of the cargo compartment, whereby the plates may be arranged and interconnected in the array within the cargo compartment so as to provide additional traction weight for the vehicle;

the width of each said plate being measured between the opposing side edges, and each said plate having a front end edge and a back end edge, the length of each said plate being measured between said front edge and said back end edge, each said plate further including a top surface and a bottom surface, the height of each plate being measured between said top surface and said bottom surface; and wherein the means for interlocking the plate with the like plates comprises:

a tongue member extending from and connected to the front edge of the plate, said tongue member extending generally downwardly from the top surface of the plate and separated from the front edge of the plate by a gap, said tongue member having a height measured from the top surface of the plate, and the gap having a width and a depth measured from the bottom surface of the plate; and a channel defined by and extending along the rear edge of the like plate, said channel having a recessed portion having a depth generally equal to or greater than the height of the tongue member, and a rear wall member extending generally upwardly from the bottom surface of the like plate generally adjacent to the rear edge of the like plate and the recessed portion, the rear wall having a height measured from the top surface of the like plate generally less than or equal to the width of the gap, whereby the tongue member of the plate may be engagingly and removably received within the recessed portion of the channel of the like plate, and the rear wall of the like plate received within the gap of the plate.

6. The weight system of claim 5 wherein the tongue member and channel each have a length, each said length being substantially equal to one another and less than the width of the plate, the tongue member being centered along the front edge of the plate and the channel being centered along the rear edge of the like plate.

7. A traction enhancing interlocking weight system for use in the cargo compartment of a vehicle, said cargo compartment having a length, a width, and a height, said interlocking weight system comprising:

a plurality of plates, each said plate having a height, a width, and a length, said height being substantially less than said width and said length, each plate having a pair of opposing side edges and a pair of opposing end edges;

means associated with each said plate for engagingly and removably interlocking said plate with a like one of said plates when said plate and said like plate are positioned in close confronting contact along an adjacent pair of said side edges or said end edges of the plate and the like plate, to interconnect said plurality of plates in an array, said array having a length and a width less than the length and the width of the cargo compartment, whereby the plates may be arranged and interconnected in the array within the cargo compartment so as to provide additional traction weight for the vehicle;

the width of each said plate being measured between the opposing side edges, and each said plate having a front end edge and a back end edge, the length of each said plate being measured between said front edge and said back end edge, each said plate further including a top surface and a bottom surface, the height of each plate being measured between said top surface and said bottom surface; and wherein the means for interlocking each of the plates with the like plates comprises:

a plurality of flange members, each said flange member extending from and connected to one of the opposing side edges of the plate and being spaced apart from the corresponding side edge of the plate by a groove; and a plurality of second flange members, each said second flange member extending from and connected to one of the opposing side edges of the like plate and being spaced apart from the corresponding side edge of the like plate by a second groove, whereby one of the flange members of the plate may be engagingly and removably received within the second groove of the like plate and the second flange member of the like plate may be engagingly and removably received within the groove of the plate to interlock the plate and the like plate.

8. The weight system of claim 7 wherein a portion of the flange member of the plate is disposed between the second flange member and the side edge of the like plate to which the plate is connected, and such that a portion of the second flange member of the like plate is disposed between the flange member and the side edge of the plate to which the like plate is connected.

9. The weight system of claim 7 wherein the number of flange members extending from each plate is two, and the number of grooves associated with each plate is thereby also two.

10. The weight system of claim 7 wherein each flange member has a height and each groove has a depth, and each second flange member has a height and each second groove having a depth, said height of the flange members being generally equal to said depth of the second grooves and to said height of the second flange members, said height of the second flange members being generally equal to said height of the flange members and said depth of the grooves.

11. The weight system of claim 7 wherein each flange member has a thickness and each groove has a width, and each second flange member has a thickness and each second groove has a width, said thickness of the flange members being generally equal to the width of the second grooves and said thickness of the second flange members being generally equal to said width of the grooves.

12. The weight system of claim 7 wherein each of the flange members extends along the entire length of the side edge of the plate, and each second flange member extends along the entire side edge of the like plate.

13. A traction enhancing interlocking weight system for use in the cargo compartment of a vehicle, said cargo compartment having a length, a width, and a height, said interlocking weight system comprising:

a plurality of plates, each said plate having a height, a width, and a length, said height being substantially less than said width and said length, each plate having a pair of opposing side edges and a pair of opposing end edges;

means associated with each said plate for engagingly and removably interlocking said plate with a like one of said plates when said plate and said like plate are positioned in close confronting contact along an adjacent pair of said side edges or said end edges of the plate and the like plate, to interconnect said plurality of plates in an array, said array having a length and a width less than the length and the width of the cargo compartment, whereby the plates may be arranged and interconnected in the array within the cargo compartment so as to provide additional traction weight for the vehicle;

the width of each said plate being measured between the opposing side edges, and each said plate having a front end edge and a back end edge, the length of each said plate being measured between said front edge and said back end edge, each said plate further including a top surface and a bottom surface, the height of each plate being measured between said top surface and said bottom surface;

wherein the means for interlocking each of the plates with the like plates comprises:

a plurality of notches, at least one of said notches being defined by the plate and having a portion defined by and recessed from the top surface of the plate and further defining a bore extending at least partially through the plate, and at least one of said notches being defined by the like plate and having a portion defined by and recessed from the top surface of the like plate and further defining a bore extending at least partially through the like plate; and a plurality of coupling pins, each coupling pin having a first depending leg segment and a second depending leg segment and a central bridge portion extending between and connected to said first and said second leg segments, whereby the first leg segment of one of the coupling pins may be engagingly and removably received within the bore of the notch defined by the plate, and the second leg segment of the coupling pin may be engagingly and removably received within the bore of the notch defined by the like plate, such that the central bridge of the coupling pin extends between the plate and the like plate to thereby interconnect the plate to the like plate.

14. The weight system of claim 13 wherein each plate defines four notches, one of the notches being positioned adjacent to each of the opposing side edges of the plate, one of the notches being positioned adjacent to the front edge of the plate, and one of the notches being positioned adjacent to the rear edge of the plate.

15. The weight of claim 14 wherein each said edge and the front and back edge of each plate each have a center, and each notch is generally aligned with said center of the corresponding edge to which the notch is adjacent.

16. The weight system of claim 13 wherein the central bridge portion of the coupling pins is at least partially received within the notch of the plate and the notch of the like plate when the leg segments of the coupling pin are received within the bores of the plate and the like plate.

17. The weight of claim 16 wherein no portion of the coupling pin extends above the top surface of the plate or the top surface of the like plate when the leg segments of the coupling pin are received within the bores of the plate and the like plate.

18. The weight system of claim 13 wherein each bore has a generally circular cross section, and each notch has a generally rectangular shape.

19. The weight system of claim 18 wherein the first and second leg segments of the coupling pins have a generally circular cross section.

20. The weight system of claim 13 wherein each coupling pin has a generally U-shape, such that the first and second leg segments are generally perpendicular to the central bridge portion and are generally parallel to one another.

21. A traction enhancing interlocking weight system for use in the cargo compartment of a vehicle, said cargo compartment having a length, a width, and a height, said interlocking weight system comprising:

a plurality of plates, each said plate having a height, a width, and a length, said height being substantially less than said width and said length, each plate having a pair of opposing side edges and a pair of opposing end edges;

means associated with each said plate for engagingly and removably interlocking said plate with a like one of said plates when said plate and said like plate are positioned in close confronting contact along an adjacent pair of said side edges or said end edges of the plate and the like plate, to interconnect said plurality of plates in an array, said array having a length and a width less than the length and the width of the cargo compartment, whereby the plates may be arranged and interconnected in the array within the cargo compartment so as to provide additional traction weight for the vehicle;

the width of each said plate being measured between the opposing side edges, and each said plate having a front end edge and a back end edge, the length of each said plate being measured between said front edge and said back end edge, each said plate further including a top surface and a bottom surface, the height of each plate being measured between said top surface and said bottom surface; and wherein the opposing side edges, front edge, and rear edge of each plate each define a path, the path of the front edge of the plate being generally the same as the path of the rear edge of the like plate, the path of rear edge of the plate being generally the same as the path of the front edge of the like plate, and the path of a first one of the side edges of the plate being generally the same as the path of the first one of the side edges of the like plate and the path of a second one of the side edges of the like plate, each path defining one or more concave regions and one or more convex regions such that the rear edge of the plate may be slidingly and removably engaged by the front edge of the like plate, the front edge of the plate may be slidingly and removably engaged by the rear edge of the like plate, said first one of the side edges of the plate may be slidingly and removably engaged by said first one of the side edges of the like plate, and said second one of the side edges of the plate may be slidingly and removably engaged by said second one of the side edges of the like plate.

22. A traction enhancing interlocking weight system for use in the cargo compartment of a vehicle, said cargo compartment having a length, a width, and a height, said interlocking weight system comprising:

a plurality of plates, each said plate having a height, a width, and a length, said height being substantially less than said width and said length, each plate having a pair of side edges and a pair of end edges; and means associated with each said plate for engagingly and removably interlocking said plate with other like plates when said plate and adjacent like plates are positioned in close confronting contact along an adjacent pair of said side edges and an adjacent pair of said end edges of the plate and the like plates and said means including a plurality of coupling members, a coupling member associated with each said pair of adjacent edges, said member extending between said adjacent plates to prevent movement of said plates toward and away from each other at right angles to said adjoining edges so as to interconnect said plurality of plates in an array, said array having a length and a width less than the length and the width of the cargo compartment, whereby the plates may be arranged and interconnected in the array within the cargo compartment so as to provide additional traction weight for the vehicle.

23. The traction enhancing interlocking weight system of claim 22 wherein:

the width of each said plate is measured between said opposing side edges, the length of each said plate being measured between said end edges, each said plate further including a top surface and a bottom surface, the height of each plate being measured between said top surface and said bottom surface; and wherein said means for engagingly and removably interlocking each of the said plates with said like plates comprises:

a plurality of notches on each said plate, with a said notch being positioned along each of said edges of said plate so that when said plate is positioned in close confronting relationship with like plates, the notches of adjacent edges of adjacent plates confront one another and communicate; and a said coupling member extending between each pair of confronting notches of adjacent plates and being receivable in each of said confronting notches to thereby interlock said plates to form said array.

24. The traction enhancing interlocking weight system of claim 23 wherein:

each said notch begins at said top surface and extends toward the said bottom surface; and each said coupling member is an integral body separate from said plate and is insertable into said confronting notches from above said top surface.

* * * * *